United States Patent Office 3,382,678
Patented May 14, 1968

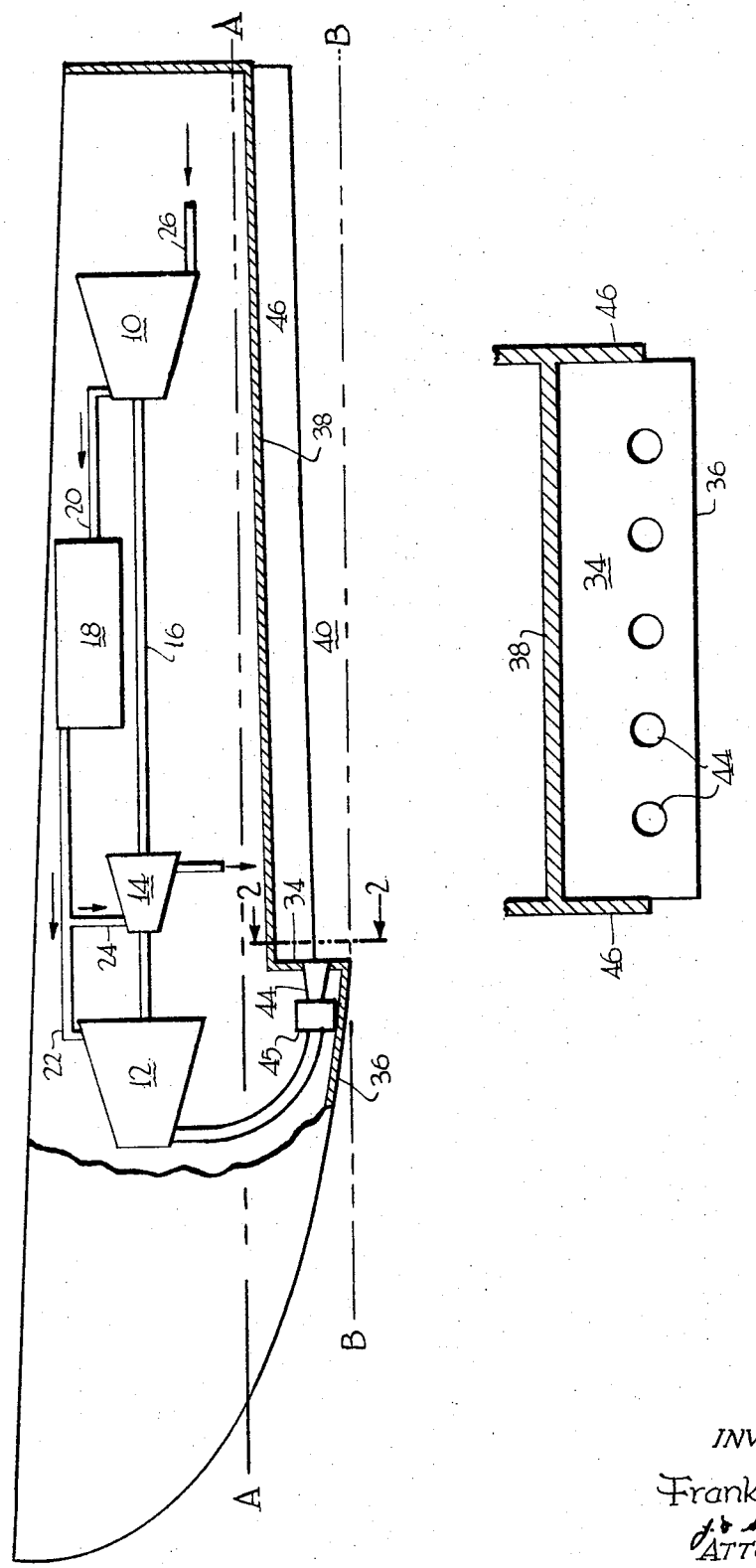

3,382,678
GAS TURBINE CYCLE PROVIDING A
HIGH PRESSURE EFFLUX
Frank J. Reh, Arlington, Va., assignor to the United
States of America as represented by the Secretary of
the Navy
Filed July 12, 1966, Ser. No. 564,702
5 Claims. (Cl. 60—264)

This invention relates to a system for developing propulsive thrust by the reaction of a flow of energized fluid and in particular is concerned with a gas turbine cycle of operation for developing the propulsive thrust.

The standard gas turbine cycles of operation of the prior art comprise the compression of incoming air in one zone and directing the compressed air to a second zone where it is admixed with a suitable fuel to effect combustion and from the combustion zone the heated gases are used for operating other equipment such as turbines, compressors, etc. In axial flow gas turbine operation, for example, the compressor blading elements and turbine blading elements are mounted for rotation on a common shaft and the incoming air passes in a serial manner through the compressor, combustion chamber surrounding the shaft and the turbine and after the equipment has been started in operation, the turbine drives the shaft by the work energy of the heated gases developed in the combustion zone.

Starting of such equipment is usually accomplished from an outside source, since the horsepower required and the length of time during which it must be applied are high. The shaft and assembled equipment must be brought up to relatively high r.p.m. before the combustion gases are able to supply sufficient energy for requisite turbine operation but after a proper initial starting, the shaft and assembled equipment will continue to operate. The general operation as explained above may be varied by adding regenerative features or by multi stage combustion chambers, turbines, etc.

This invention is directed to a gas turbine cycle of operation in which a turbine is mounted on a shaft between a first stage compressor and a second stage compressor while the combustion chamber is positioned independently of the shaft. An arrangement of conduits provide communication between the compressors and the combustion chamber and between the combustion chamber and the turbine. Such arrangement of this gas turbine equipment is for the purpose of permitting the incoming air to be compressed in the first stage compressor and the combustion products divided which permits a selected portion to be directed to the turbine for driving the shaft and the remainder to be directed to the second stage compressor while the efflux from the second stage compressor can be utilized for other work, i.e., as a ram jet or for operating auxiliary equipment.

An object of this invention is to provide an improved cycle of gas turbine operation wherein provision is made for compressing combustion gases before the extraction of work energy.

Another object of the invention is to provide a gas turbine system of operation which permits the combustion gases to be utilized in operating the equipment of the system and to also be used in operating other equipment.

Other objects, advantages and novel features of the invention will become apparent from the following detailed description of the invention when considered in conjunction with the accompanying drawings, wherein FIGURE 1 shows the gas turbine equipment of the invention diagrammatically and arranged within a vessel which has a portion of the hull broken away.

FIGURE 2 is a view on the line 2—2 of FIGURE 1.

In FIGURE 1 the gas turbine equipment of this invention comprises a first stage compressor represented by housing 10, a second stage compressor represented by housing 12 and a turbine represented by housing 14 which is positioned between the compressors. Although not shown in detail, it will be understood that the compressors and the turbine will all be equipped with rotor blading which is mounted on shaft 16 and rotatable therewith relative to stator blading which is carried by the respective housings. Such equipment is operative to carry out the compression and turbine functions as is well known in the prior art. A combustion chamber 18 is spaced from shaft 16 and is arranged to be in communication with the first stage compressor 10 by conduit 20 and in communication with the second stage compressor 12 by conduit 22 while a branch conduit 24 from conduit 22 is in communication with the turbine 14.

After the above described equipment is started by suitable auxiliary starting devices, the incoming air may be admitted to the first stage compressor 10 by inlet 26 and compressed air from the first stage supplied to the combustion chamber 18 by conduit 20. Portions of the heated gases from the combustion chamber 18 are then transmitted in selected volumes to the turbine 14 and the second stage compressor 12. For selecting these volumes, suitable valves will be provided in lines 22 or 24.

It is contemplated that the greater portion of the combustion gases will be transmitted to the second stage compressor 12 wherein the gases will be compressed to a high pressure for use as a ram jet or for other desired use. The portion of the combustion gases transmitted to the turbine 14 will be that volume required to effect the desired degrees of compression in the first compressor stage 10 and in the second compressor stage 14.

From the above description it will be seen that in addition to using part of the combustion gases from chamber 18 for operating the gas turbine equipment it is advantageous to provide for the further compression of a part of the combustion gases. One advantage of such operation resides in the requirement of only a small amount of energy or fuel consumption to raise the products from the combustion chamber to a higher energy level in the second stage compressor and another resides in the utilization of these high energy level gases as a high velocity stream or ram jet.

In FIGURE 1, the heretofore described gas turbine equipment of this invention is shown located within a vessel indicated at 30 and the vessel 30 is of a particular design permitting the high energy gases developed in the second stage compressor 12 to be used effectively in propelling the vessel 30. To this end the hull 32 of the vessel is provided with a stepped zone formed by a vertical wall 34 which interconnects the fore bottom portion 36 of the vessel with the aft bottom portion 38. An upper broken horizontal line A'—A is shown in connection with FIGURE 1 to represent the water level when the vessel 30 is at rest while a lower broken line B—B is shown to represent the water level when the vessel is in motion. In the latter situation, an air cushion zone represented at 40 is formed between the aft bottom portion 38 of the vessel and the water level.

In order to effect propulsion of the vessel 30, the air and gas flow will be as shown by the arrowed lines in FIGURE 1 and the highly compressed gases from the second stage compressor 12 will be transmitted to the air cushion zone 40 by conduit 42 and through nozzle means 44 as a high velocity jet. A manifold represented at 45 is provided to form the nozzle means 44 in one pattern as shown in FIGURE 2 which is for the purpose of effecting distribution of the high velocity efflux in a manner to form a cushion beneath substantially the entire surface area of the vessel bottom 38 and maintain the vessel 30 in relation to the water line B—B generally as shown in FIGURE 1. For this purpose it may be advantageous to provide skirts 46 as shown in FIGURE 2.

Obviously many modifications and variations of the present invention are possible in the light of the above teachings. It is therefore to be understood that, within the scope of the appended claims, the invention may be practiced otherwise than as specifically described.

I claim:
1. A gas turbine power system for developing high pressure efflux which comprises,
   (a) a rotor shaft mounting a first stage compressor, a second stage compressor and a turbine,
   (b) a combustion chamber spaced from the shaft,
   (c) conduit means providing communication between the first stage compressor and the combustion chamber,
   (d) other conduit means for removing combustion products from the combustion chamber,
   (e) said other conduit means providing independent communication with the turbine and independent communication with the second stage compressor and
   (f) exhaust conduit means for removing compressed combustion products from the second stage compressor as high pressure efflux.
2. A gas turbine power system as set forth in claim 1, further characterized by said turbine and said combustion chamber being located in a zone generally between the first and the second stage compressors.
3. A gas turbine power system as set forth in claim 1, further characterized by said other conduit means selectively supplying sufficient combustion products to the turbine for operating the rotor shaft and supplying the remaining combustion products to the second stage compressor.
4. A gas turbine power plant as set forth in claim 1, further characterized by said exhaust conduit means having nozzle means for jetting the high pressure efflux as high velocity streams.
5. A gas turbine power plant as set forth in claim 4, further characterized by said high velocity streams being utilized for ship propulsion by providing an air cushion for the ship's hull in order to minimize drag.

References Cited
UNITED STATES PATENTS

| | | | |
|---|---|---|---|
| 2,623,356 | 12/1952 | Coanda | 60—262 |
| 3,188,811 | 6/1965 | Lueders | 60—39.07 |

CARLTON R. CROYLE, *Primary Examiner.*

D. HART, *Assistant Examiner.*